(12) United States Patent
Jentz et al.

(10) Patent No.: US 8,725,347 B2
(45) Date of Patent: May 13, 2014

(54) SYSTEM AND METHOD FOR PERFORMING EVAPORATIVE LEAK DIAGNOSTICS IN A VEHICLE

(71) Applicant: Ford Global Technologies, LLC, Dearborn, MI (US)

(72) Inventors: Robert Roy Jentz, Westland, MI (US); David Allen Clemens, Canton, MI (US); Ann Irene Sipes, Milan, MI (US); Aed M. Dudar, Canton, MI (US); Michael Igor Kluzner, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/025,349

(22) Filed: Sep. 12, 2013

(65) Prior Publication Data
US 2014/0019002 A1 Jan. 16, 2014

Related U.S. Application Data

(63) Continuation of application No. 13/367,635, filed on Feb. 7, 2012, now Pat. No. 8,560,167.

(60) Provisional application No. 61/444,249, filed on Feb. 18, 2011.

(51) Int. Cl.
*G01M 17/00* (2006.01)
*B62D 5/06* (2006.01)
*B60R 21/26* (2011.01)

(52) U.S. Cl.
USPC .......................... 701/32.7; 180/441; 280/736

(58) Field of Classification Search
USPC ........... 701/22, 81; 180/65.21, 174–179, 202, 180/6.28, 6.5, 214.216, 218, 242, 279, 53.5, 180/60, 65.1–65.8, 407, 412, 415, 422, 180/443; 280/735, 707, 422; 318/158; 340/428
See application file for complete search history.

(56) References Cited

U.S. PATENT DOCUMENTS

| | | | |
|---|---|---|---|
| 5,347,971 | A | 9/1994 | Kobayashi et al. |
| 5,349,935 | A | 9/1994 | Mezger et al. |
| 5,817,925 | A | 10/1998 | Cook et al. |
| 5,898,103 | A | 4/1999 | Denz et al. |
| 6,082,337 | A | 7/2000 | Fujimoto et al. |
| 6,089,081 | A | 7/2000 | Cook et al. |

(Continued)

OTHER PUBLICATIONS http://www.landroversonly.com/forums/f40/evaportive-system-test-not-running-31890/, "Evaportive System Test not running—Land Rovers Only—Land Rover Forum", Jun. 14, 2010, 4 pages.

(Continued)

*Primary Examiner* — Muhammad Shafi
(74) *Attorney, Agent, or Firm* — Brooks Kushman P.C.; James Dottavio

(57) ABSTRACT

A method is provided for performing an evaporative leak diagnostic for a vehicle. A valve in a diagnostic module is commanded to a vent position. The valve connects a fuel system to atmosphere. A pump in the diagnostic module is operated to measure a reference pressure across an orifice in the diagnostic module to provide a threshold. The valve is commanded to a test position. The pump is operated to place the fuel system in a low pressure state. A series of pressures in the fuel system is measured. A diagnostic code is provided after comparing the series of pressures to the threshold.

13 Claims, 5 Drawing Sheets

(56) References Cited

U.S. PATENT DOCUMENTS

| | | |
|---|---|---|
| 6,131,550 A | 10/2000 | Fritz et al. |
| 6,182,642 B1 | 2/2001 | Ohkuma |
| 6,321,728 B1 | 11/2001 | Ohkuma |
| 6,374,663 B1 | 4/2002 | Muller et al. |
| 6,523,398 B1 | 2/2003 | Hanai et al. |
| 6,550,315 B2 | 4/2003 | Streib |
| 6,604,407 B2 | 8/2003 | Kano et al. |
| 6,698,280 B1 | 3/2004 | Iden et al. |
| 6,722,348 B2 | 4/2004 | Nagasaki et al. |
| 6,807,851 B2 | 10/2004 | Wakahara et al. |
| 6,832,509 B2 | 12/2004 | Morinaga et al. |
| 6,845,652 B2 | 1/2005 | Stegmann et al. |
| 6,854,321 B2 | 2/2005 | Amlin |
| 6,880,383 B2 * | 4/2005 | McLain et al. ............... 73/49.2 |
| 6,945,093 B2 | 9/2005 | Amano et al. |
| 6,959,587 B2 | 11/2005 | Schulz et al. |
| 6,971,375 B2 | 12/2005 | Amano et al. |
| 6,988,391 B2 | 1/2006 | Amano et al. |
| 6,993,957 B2 | 2/2006 | Kano et al. |
| 7,004,013 B2 | 2/2006 | Kobayashi et al. |
| 7,036,354 B2 | 5/2006 | Itakura et al. |
| 7,051,718 B2 | 5/2006 | Tsuruta et al. |
| 7,107,827 B2 | 9/2006 | Kobayashi et al. |
| 7,114,372 B2 | 10/2006 | Kano et al. |
| 7,124,749 B2 | 10/2006 | Ohhashi et al. |
| 7,137,288 B2 | 11/2006 | Kobayashi et al. |
| 7,162,914 B2 | 1/2007 | Streib et al. |
| 7,219,660 B2 | 5/2007 | Amano et al. |
| 7,284,530 B2 | 10/2007 | Nagasaki et al. |
| 7,313,487 B2 | 12/2007 | Yoshioka et al. |
| 7,318,425 B2 | 1/2008 | Kano et al. |
| 7,350,399 B2 | 4/2008 | Kobayashi et al. |
| 7,360,401 B2 | 4/2008 | Kano |
| 7,426,919 B2 | 9/2008 | Kano et al. |
| 7,441,549 B2 | 10/2008 | Takayanagi |
| 7,448,367 B1 | 11/2008 | Reddy et al. |
| 7,469,686 B2 | 12/2008 | Kano et al. |
| 7,472,583 B2 | 1/2009 | Kato et al. |
| 7,484,406 B2 | 2/2009 | Miyahara |
| 7,500,474 B2 | 3/2009 | Kano et al. |
| 7,506,639 B2 | 3/2009 | Saito |
| 7,562,559 B2 | 7/2009 | Chung et al. |
| 2003/0172912 A1 | 9/2003 | Kanai et al. |
| 2005/0248308 A1 * | 11/2005 | Reed et al. ............... 318/806 |
| 2006/0065253 A1 | 3/2006 | Reddy |
| 2007/0079650 A1 | 4/2007 | Streib et al. |
| 2007/0089721 A1 * | 4/2007 | Amano et al. ............... 123/698 |
| 2009/0299561 A1 * | 12/2009 | Matsumoto ............... 701/22 |

OTHER PUBLICATIONS

"Fuel and EVAP System", Toyota Hybrid System Diagnosis—Course 072, 2004, 18 pages.

* cited by examiner

SYSTEM AND METHOD FOR PERFORMING EVAPORATIVE LEAK DIAGNOSTICS IN A VEHICLE

CROSS-REFERENCE TO RELATED APPLICATIONS

This application is a continuation of U.S. application Ser. No. 13/367,635 filed Feb. 7, 2012, which, in turn, claims the benefit of U.S. provisional Application No. 61/444,249 filed Feb. 18, 2011, the disclosure of which is incorporated in its entirety by reference herein.

TECHNICAL FIELD

Various embodiments relate to performing evaporative leak diagnostics in a fuel system coupled to an internal combustion engine.

BACKGROUND

Vehicles may be required to have diagnostics to validate the integrity of fuel systems, such as a fuel evaporation collection system, for potential leaks. Natural vacuum techniques or engine vacuum techniques have been used to provide the vacuum level to run the diagnostic. Natural vacuum may be provided in a conventional vehicle from heat rejected from an operating internal combustion engine into the tank. With vehicles such as hybrids, the engine may never turn on during a drive cycle and natural vacuum may not be available.

SUMMARY

In an embodiment, a method for performing an evaporative leak diagnostic for a vehicle is provided. A valve in a diagnostic module is commanded to a vent position. The valve connects a fuel system to atmosphere. A pump in the diagnostic module is operated to measure a reference pressure across an orifice in the diagnostic module to provide a threshold. The valve is commanded to a test position. The pump is operated to place the fuel system in a low pressure state. A series of pressures in the fuel system is measured. A test diagnostic code is provided after comparing the series of pressures to the threshold.

In another embodiment, a vehicle is provided with a fuel system, and a diagnostic module with an orifice, a pressure sensor, and a pump. The module connects the fuel system to atmosphere. The vehicle has a controller. The controller is configured to: (i) measure a reference pressure across the orifice to provide a threshold; (ii) isolate the fuel system in a low pressure state; (iii) measure a series of pressures in the system; and (iv) provide a code after in response to comparing the series of pressures to the threshold.

In yet another embodiment, a vehicle is provided with a first prime mover and a fuel system having a fuel tank connected to a canister by an isolation valve, with the canister connected to the first prime mover. The vehicle has a second prime mover. A diagnostic module has a changeover valve, an orifice, a pressure sensor, and a pump, where the module connects the fuel system to atmosphere. A controller is configured to: (i) measure a reference pressure across the orifice to provide a threshold with the changeover valve in a first position; (ii) command the isolation valve to a closed position and command the changeover valve to a second position to isolate the fuel system; (iii) command the pump to place the fuel system in a low pressure state; (iv) measure a series of pressures in the fuel system; (v) provide a fault diagnostic code when at least one of the series of pressure measurements crosses the threshold within a predetermined time; and (vi) provide a fault diagnostic code when a slope of the series of pressure measurements after another predetermined time indicates a future pressure measurement crossing the threshold.

Various embodiments according to the present disclosure have associated advantages. A low power vacuum pump may be used after a stabilization period after a vehicle is shut down to perform the evaporative leak diagnostics on the fuel tank and associated components. A pump draws vacuum across a reference orifice (reference pull) to obtain a leak threshold and then draws vacuum on the fuel system (vacuum pull). An electronic control module (ECM) compares the vacuum pull to the reference pull to determine integrity of the fuel system and test for evaporated fuel leaks. Normalizing filters may be used to allow comparison between multiple test runs and to facilitate calibration of a different vacuum level leak test. A vapor generation evaluation routine may be used to improve accuracy of diagnostics under high vapor rate generating conditions.

As such, various embodiments according to the present disclosure permit use of a diagnostic for the fuel system of a vehicle to test for system integrity. The use of a fuel pump in the diagnostic module allows for use of the diagnostic in both conventional and hybrid vehicles, as it does not rely on natural vacuum provided by an engine to supply vacuum to test for fuel system integrity. The diagnostic uses a single orifice to test for system integrity against multiple test thresholds, such as those set by various regulatory agencies, and does not require a different orifice size for each test standard. The diagnostic compares test pressure measurements to various thresholds that represent the various standards. A diagnostic code may be set if the pressure in the fuel system crosses the respective threshold during a test, or if a combination of the slope of the pressure measurement and time indicate a future crossing of the threshold. The diagnostic may initiate within a short time after vehicle shutdown, such as on the order of tens of minutes as opposed to hours in other systems, which provides for a greater frequency of tests over the vehicle lifetime. A vapor generation test may be conducted at the end of the diagnostic to determine the validity of a diagnostic code.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
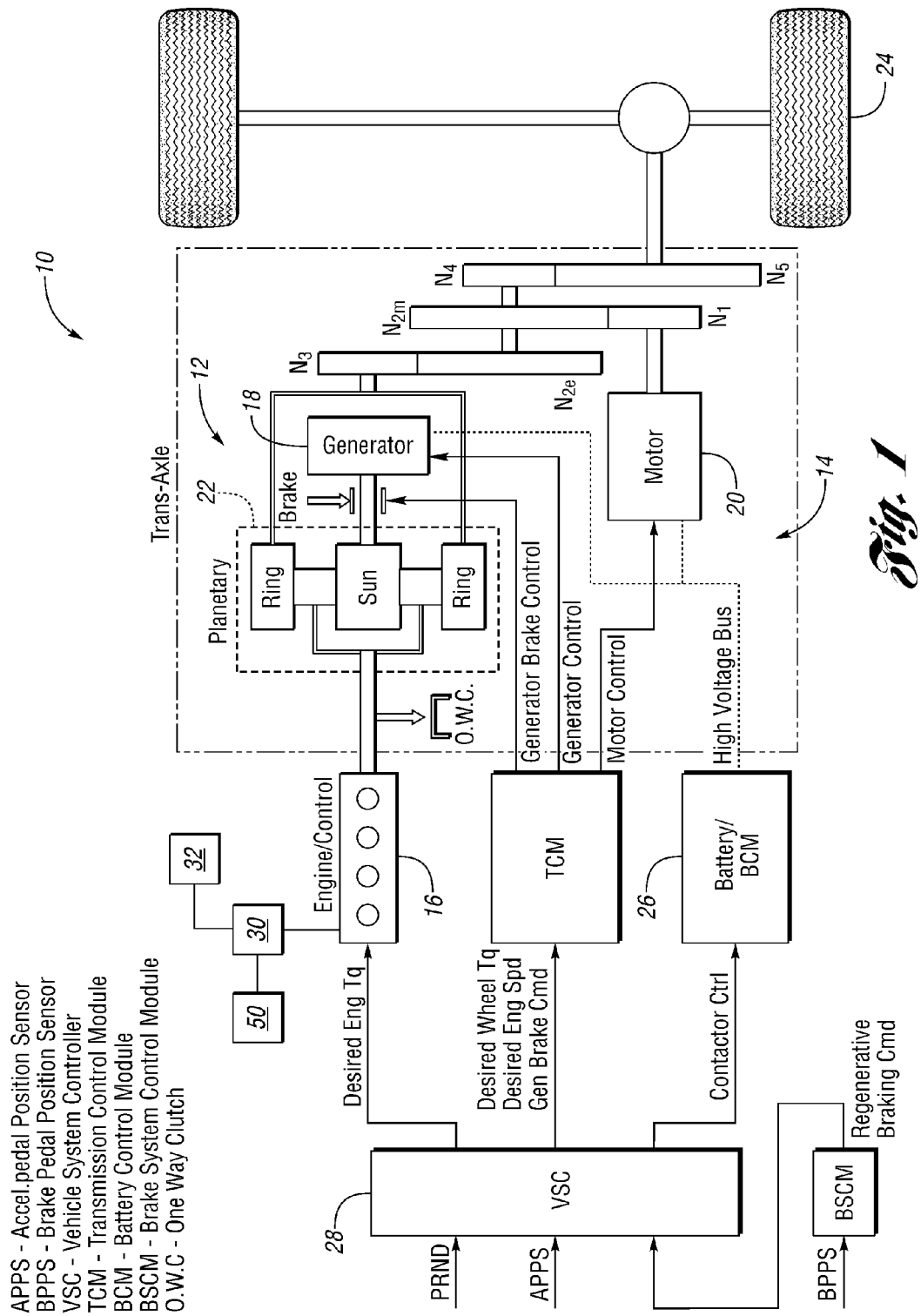
FIG. 1 is a schematic of a hybrid vehicle for use with an embodiment.

In FIG. 1, an embodiment of a hybrid electric vehicle (HEV) 10 is shown schematically. In this powertrain configuration, there are two power sources 12, 14 that are connected to the driveline: 12) a combination of engine and generator subsystems using a planetary gear set to connect to each other, and 14) the electric drive system (motor, generator, and battery subsystems). The battery subsystem is an energy storage system for the generator and the motor. The power sources 12, 14 and the wheels 24 are coupled through a transmission 22 such as a planetary gearset, or others as are known in the art. FIG. 1 illustrates one possible HEV configuration. However, there are many alternatives for configuring HEVs which do not depart from the scope of the present disclosure.

A battery 26 provides electrical energy or absorbs electrical energy, depending on the operational mode of the vehicle 10. Battery 26 may also be electronically coupled to a vehicle system controller (VSC) 28 via sensors to monitor state of charge of the battery, battery health, etc. In one embodiment, battery 26 is a high voltage battery to facilitate large power extraction from, or storage into, battery 26. In some embodiments, the vehicle 10 is a plug-in hybrid electric vehicle (PHEV), and the battery 26 has a receptacle which allows the battery 26 to connect to an external power source, such as the electric grid, for recharging.

Operator inputs to vehicle 10 include a gear shift selector, an emergency brake pedal, switch, or lever, and others. The engine 16 is also coupled to a canister 30 filled with an absorbent material, such as an activated carbon canister. The carbon canister is in fluid communication with the fuel tank 32 for the vehicle 10.

FIG. 1 represents one type of HEV architecture. However, this is just one example and not intended to be limiting. The present disclosure may be applied to any suitable HEV, including, but not limited to PHEVs. Furthermore, the present disclosure may be applied to any conventional vehicle that includes a start motor. Most conventional vehicles operate under conditions that provide sufficient time to perform a system integrity or leak test of the fuel system. However, some conventional vehicles may benefit from additional opportunities to perform leak tests of the purge system, e.g., alternative fuel vehicles using particularly volatile fuels and stop-start vehicles, for example.

There are requirements for emission system components, including the fuel system 31, to be periodically tested onboard the vehicle 10. To reduce or prevent fuel vapors from entering the atmosphere, the fuel tank 32 is provided with a vent communicating to a canister 30. The canister 30 is filled with an absorbent material, such as activated carbon, to absorb fuel vapors. As gases containing fuel vapor pass through the absorbent material, the fuel vapor is absorbed. The fuel system 31 may be tested for integrity of the system, or can be diagnosed for leaks of evaporated fuel, by putting all or a portion of the system 31 under a vacuum and observing any change in pressure. The evaporative leak test system (ELS) 50 isolates the fuel system 31 to perform a system leak test, and is also used during a purging or refueling operation. By monitoring evaporative emissions system integrity and promptly detecting any leaks, the ELS 50 contributes to the reduction of greenhouse gas emissions, such as hydrocarbons.

Figure 2:
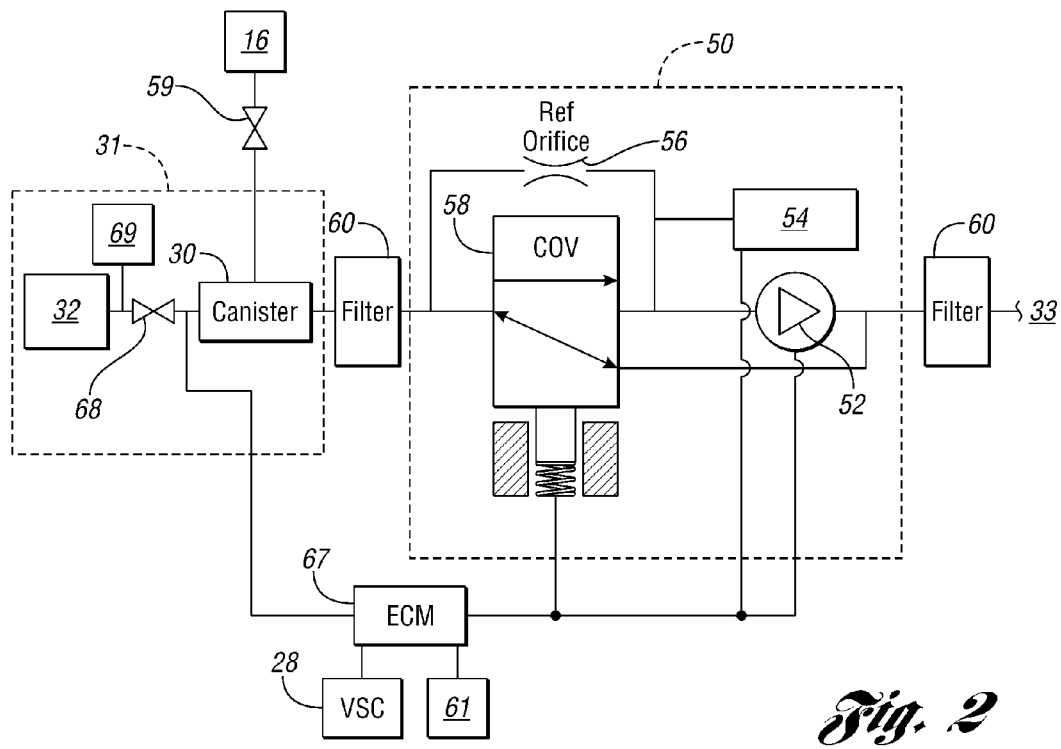
FIG. 2 is a schematic of a evaporative leak system according to an embodiment.

An evaporated leak test system (ELS) 50 is shown in FIG. 2 and contains a pump 52 to draw vacuum on the fuel tank 32 and canister 30. A fuel tank isolation valve (FTIV) 68 selectively connects the fuel tank 32 and the canister 30 and may be used to isolate the two. The ELS 50 is also connected to the canister 30 and also to a vent 33 which is connected to the ambient atmosphere. The ELS 50 consists of the vacuum pump 52, an absolute pressure sensor 54, a reference orifice 56, and a change-over valve (COV) 58. The COV 58 may be operated using a solenoid. The ELS 50 may have filters 60 on either side to prevent particulate matter, or the like, from entering or passing through the ELS 50.

Emissions regulations provide various leak levels that are required to be met for the vehicle 10. For example, the OBDII standard for green states has a 0.02 inch leak threshold. The 0.02 inch threshold relates to a 0.02 inch diameter hole in a system, or multiple holes having an equivalent diameter as the 0.02 inch diameter hole. If the hole is 0.02 inches or larger, the leak test crosses the threshold for the test and the corresponding regulation. Other states, federal government, or foreign nations may have different standards, e.g. 0.04 inch threshold, or require multiple standards to be tested, e.g. 0.02 inch and 0.04 inch. Although 0.02 inch and 0.04 inch are used throughout the disclosure, other values for leak thresholds are contemplated.

In one embodiment, the reference orifice 56 is sized as 0.02 inches to provide a 0.02 inch reference check every time the ELS 50 is run. The use of an orifice 56 sized the same as the leak threshold allows for variability in temperature, altitude, fuel levels, fuels types, etc. for the vehicle. The pressure reference measured during a reference check using the orifice 56 will vary with respect to the atmospheric conditions, as will the pressure measurements during the leak test itself, thereby providing a common baseline between the reference check and the leak test, and eliminating the need to correct for atmospheric and other factors.

The reference check performed using the orifice 56 is used as the threshold for monitoring system integrity relative to the 0.02 inch threshold. Using the orifice 56 to provide the reference check removes the need to calculate thresholds in advance and have an on-board database. Previously, a database was calculated as a function of fuel level indicator (FLI), ambient temperatures, barometric pressure, etc. and mapped into VSC 28 memory. With the use of an orifice 56, the threshold is dynamically established at the beginning of the test sequence and the prevailing noise/control factors are accounted for in establishing the reference check.

An electronic control module (ECM) 67 is connected to the pump 52, the pressure sensor 54, the COV 58, and the FTIV 68, along with any other valves and sensors in the ELS 50. The ECM may be connected to or integrated into the VSC 28. Additionally, the ECM 67 is connected to a barometric pressure sensor 61.

Figure 3:
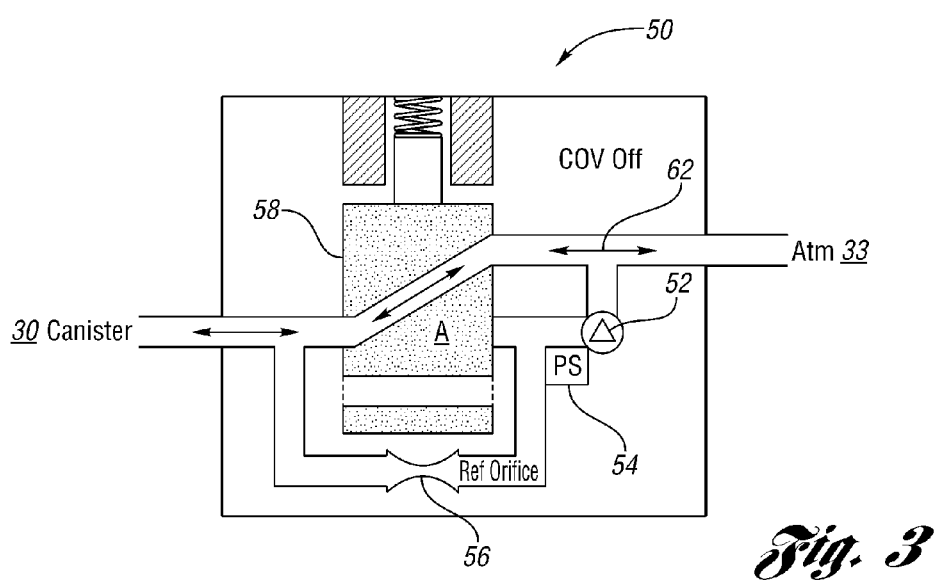
FIG. 3 is a schematic of the evaporative leak system of FIG. 2 shown in a purge/fill configuration.

FIG. 3 illustrates a typical purge flow/fuel fill configuration using the ELS 50. When an automotive fuel tank is filled, fuel vapor laden air is displaced by the fuel. Also, daily (diurnal) temperature variations lead to lower molecular weight components of the fuel vaporizing during the heat of the day. These fuel vapors are absorbed in canister 30. The absorbent material, such as activated carbon, has a limited ability to store fuel and, therefore, needs purging to be able to once again absorb fuel vapor displaced from the fuel tank. This is accomplished by periodically pulling fresh air through the carbon pellet bed within carbon canister 30 and inducting that air, which contains desorbed fuel, into an operating internal combustion engine 16. The fuel vapors that are desorbed into the incoming air are combusted in engine 16 before being exhausted. Fresh air is drawn into canister 30. Such operation may be referred to as purge mode because it partially or completely purges the stored fuel vapors from carbon canister 30. In the present disclosure, the system 31 refers to fuel tank 32, canister 30, and the associated plumbing, valves, and controls of such valves.

The vacuum/pressure path 62 for a purge/fill operation is shown using the arrows. The ELS 50 is vented to the atmosphere 33 through the COV 58, shown in configuration A. The pump 52 is turned on to provide the flow of air into or out of the canister 30.

Figure 4:
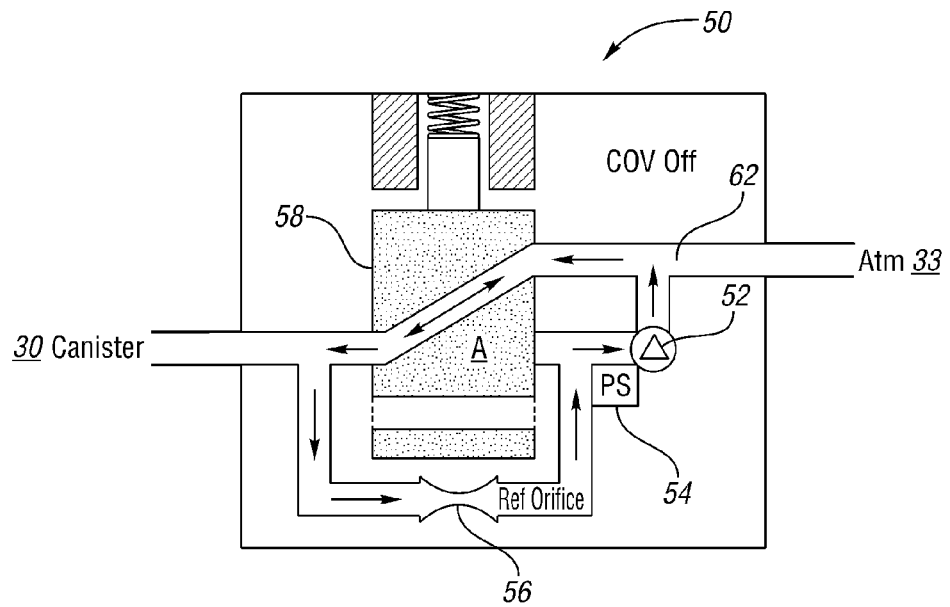
FIG. 4 is a schematic of the evaporative leak system of FIG. 2 shown in a reference threshold measurement configuration.

For leak detection, a reference check, shown in FIG. 4, is performed first. The COV 58 is in configuration A. The vacuum pump 52 is turned on, and vacuum is drawn across the reference orifice 56 and the ensuing vacuum level measured by pressure sensor 54 becomes the threshold criteria for determining whether to set a diagnostic code and/or performing other actions. The vacuum/pressure path 64 for a reference check is shown using the arrows.

Figure 5:
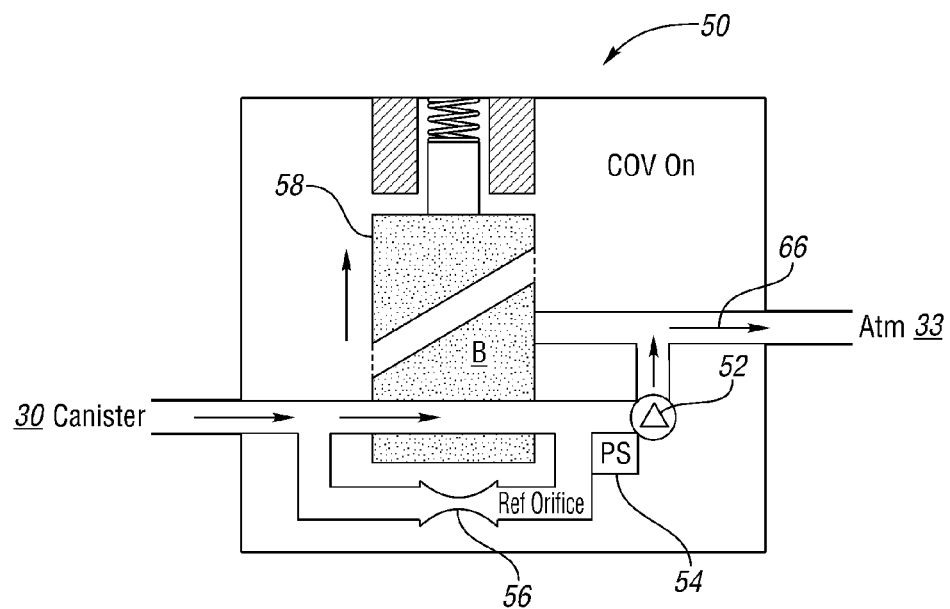
FIG. 5 is a schematic of the evaporative leak system of FIG. 2 shown in a leak testing configuration.

Once the reference check is established, it is time to perform the actual leak testing, shown in FIG. 5. The vacuum path 66 for a leak test is shown using the arrows. The COV 58 is placed into configuration B and the pump 52 is turned on. Depending on the volume of the fuel system 31 being evacuated, it may take anywhere from five to twenty minutes, for example, for the vacuum level to saturate. Once the saturation is reached, the vacuum level measured by the pressure sensor 54 is compared against that of the vacuum level when the reference check was performed (as shown in FIG. 4).

Figure 6:
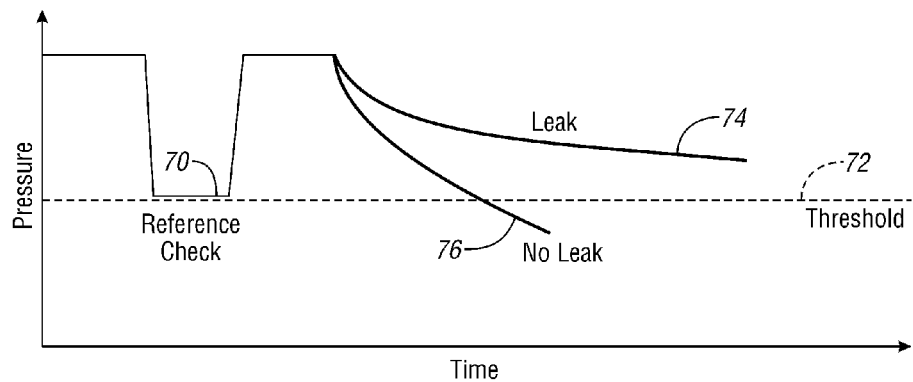
FIG. 6 is a plot showing a reference check and leak threshold as provided by the system of FIG. 2.

A typical plot of a test sequence with pressure of the fuel system vs. time is shown in FIG. 6, with various outcomes. The reference check 70 is shown as being at the threshold level 72 based on the predetermined diagnostic threshold. If during the leak test, the vacuum level (pressure in this example) is higher than the reference check 70 after saturation, the test indicates a leak as shown at 74. If during the leak test, the vacuum level is lower than the reference check 70 after saturation, the test indicates no significant leaks as shown at 76. The fuel system 31 is then relieved back to atmospheric pressure before the pump 52 evacuates the entire fuel system 31. If the ensuing vacuum measured by the pressure sensor 54 crosses the reference check line 72, then the system 31 is deemed to be substantially leak-free. Otherwise, if the vacuum signal saturates or reaches a steady state value above the reference check line 70, then the system 31 is deemed to have a leak that exceeds the specified level or threshold, for example the leak is greater than 0.02 inch.

The ELS 50 diagnostic allows for improved leak testing. Slopes of pressure measurements over time may be used to determine whether the vacuum signal has flat-lined and will never reach the reference level, which allows for an early determination of a leak that exceeds the specified criterion.

The ELS 50 may be used to detect leaks based on multiple thresholds without requiring different hardware components, such as a different size reference orifice. For example, the leak threshold specified in a first state or other jurisdiction may be 0.02 inch, while another jurisdiction may specify a leak threshold of 0.04 inch, for example. The ELS 50 may be used to detect either of these conditions using the same reference orifice 56.

A vapor generation test phase may be used with the ELS 50 to filter out inaccurate leak determinations associated with high vapor rate generation, which may occur immediately after vehicle shutdown when the fuel tank may be at a higher than ambient temperature, for example. High vapor generation rates cause a pressure buildup in the fuel tank 32. If the vapor generation rate is too high, the vacuum output of the pump 52 may not be able to overcome the pressure build. Currently, leak testing systems typically wait for an extended period of time, on the order of many hours, before performing the leak check to allow the vapor generation rate and associated fuel system pressure to stabilize as the fuel temperature returns to ambient. Contrary to various prior art strategies, the present disclosure allows for leak testing much sooner after shutdown of the vehicle 10. By performing the leak test sooner, the frequency of the completed tests (number of times the test is completed after vehicle 10 shutdown) are also improved, which may be monitored by various emissions regulatory boards. The leak test is controlled by the ECM 67, which is kept in a low power or other powered setting from key off in the vehicle through the test. The ECM 67 may be kept in a powered standby mode until the fuel system cools sufficiently to operate the test, and then is activated into a normal operating mode to perform the diagnostic. In prior art systems, the control module may be powered off with the vehicle and require a more complex wake up strategy to begin a test after the vehicle has been shut down for a sufficient time.

If there is ample pressure or vacuum in the tank 32, as measured by pressure sensor 69, the inference is that the tank 32 is leak-free and only the canister 30 side of the system 31 is checked for leaks. This saves cycle time and reduces wear on the pump 52.

The ELS may check that the canister purge valve (CPV) 59 is functioning. The ECM 67 conducts a stuck open CPV 59 test after a barometric pressure measurement is obtained. The controller 67 commands the CPV 59 to a closed position, and commands the COV 58 to configuration B. The pressure in the ELS 50 is monitored for an increase in vacuum, or decrease in pressure, while the engine 16 is operating. Any vacuum buildup beyond a threshold value is inferred to come from a CPV 59 that is not fully closed, that is not functioning within specification, or that has a leak. To remove influence on the vacuum measurements during the test from the fuel tank 32, the FTIV 68 is commanded closed during this test.

The ELS 50 may check for a blocked or restricted inlet from the atmosphere 33 or filter 60 while the engine is operating. During a purge process for the canister 30, atmospheric air flows through the ELS 50 and through the canister 30 to entrain fuel vapors contained in the canister 30 to empty the canister 30 of fuels. The fuel laden air is then introduced into the intake for the engine 16 through an open CPV 59, where the fuel vapor is combusted. The COV 58 is placed in configuration A. The ECM 67 monitors the pressure sensor 54 in the ELS 50 during the purge process. If a pressure drop, or vacuum buildup, is detected, the ECM 67 sets a fault flag corresponding to a potential restricted or blocked atmospheric air flow from atmosphere 33, such as in filter 60.

The ELS 50 may also check for purge flow when the engine 16 is operating to ensure that the CPV 59 is not fixed in a closed position. With the engine 16 running, a canister purge valve (CPV) 59 is commanded to open and the COV valve 58 is energized (placed into configuration B) to create a restriction. The CPV 59 connects the canister 30 to the intake of the engine 16. The pressure sensor 54 is used to detect a significant vacuum drop as affirmation that the CPV 59 indeed opened and that purge flow is not restricted. For example, the CPV 59 is tested for being not fixed in a closed position while the engine 16 is operating and purge of the canister 30 is beginning. The COV 58 is closed, or placed in configuration B to create a restriction. If the pressure sensor 54 in the ELS 50 indicates a pressure drop, or an increase in vacuum, the flow path for purge vapors is considered open and the CPV 59 is validated for an open position.

Normalizers may be used with the ELS 50 by dividing the resulting stabilized vacuum obtained in phase 3 by the reference vacuum obtained in phase 1. The normalizers allow viewing of all the data on a single plot and reduce the calibration effort otherwise required for various threshold levels, e.g. for the 0.02 inch calibration and also for the 0.04 inch calibration.

Figure 7:
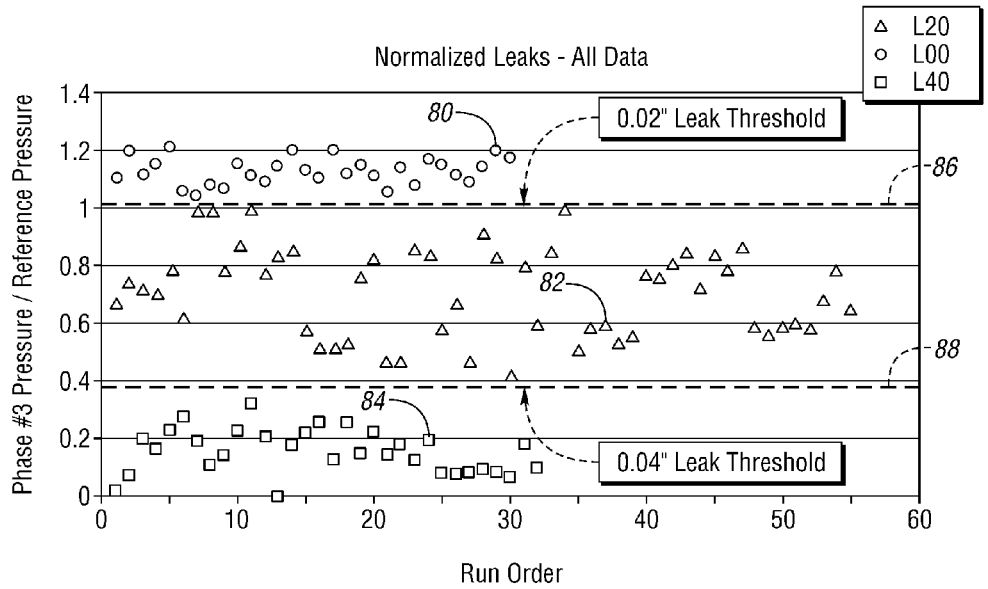
FIG. 7 is a plot showing normalized leak test data for comparison of two different thresholds measured by the same system.

FIG. 7 depicts "normalized" data with various leaks. By using a normalized pressure (the pressure measured over the reference pressure), 0.02 inch as well as 0.04 inch leak data can be viewed on the same plot, which makes establishing thresholds easier. The plot contains no leak data 80 (circles), 0.02 inch leak data 82 (triangles), and 0.04 inch leak data 84 (squares). Normalizing the data assists with setting the thresholds to minimize inaccurate test results. For a 0.02 inch calibration, anything above the 0.02 inch leak threshold line 86 does not result in a diagnostic code or other remedial actions while anything below threshold line 86 may trigger a diagnostic code or various corresponding engine/vehicle control actions. For 0.04 inch calibrations, anything above the 0.04 inch threshold line 88 indicates no significant leak and anything below line 88 indicates a leak that may result in a diagnostic flag, code, or similar action. The diagnostic code may be a pass code, a fault code, a service code, an abort test code, or other code types as are known in the art.

Figure 8:
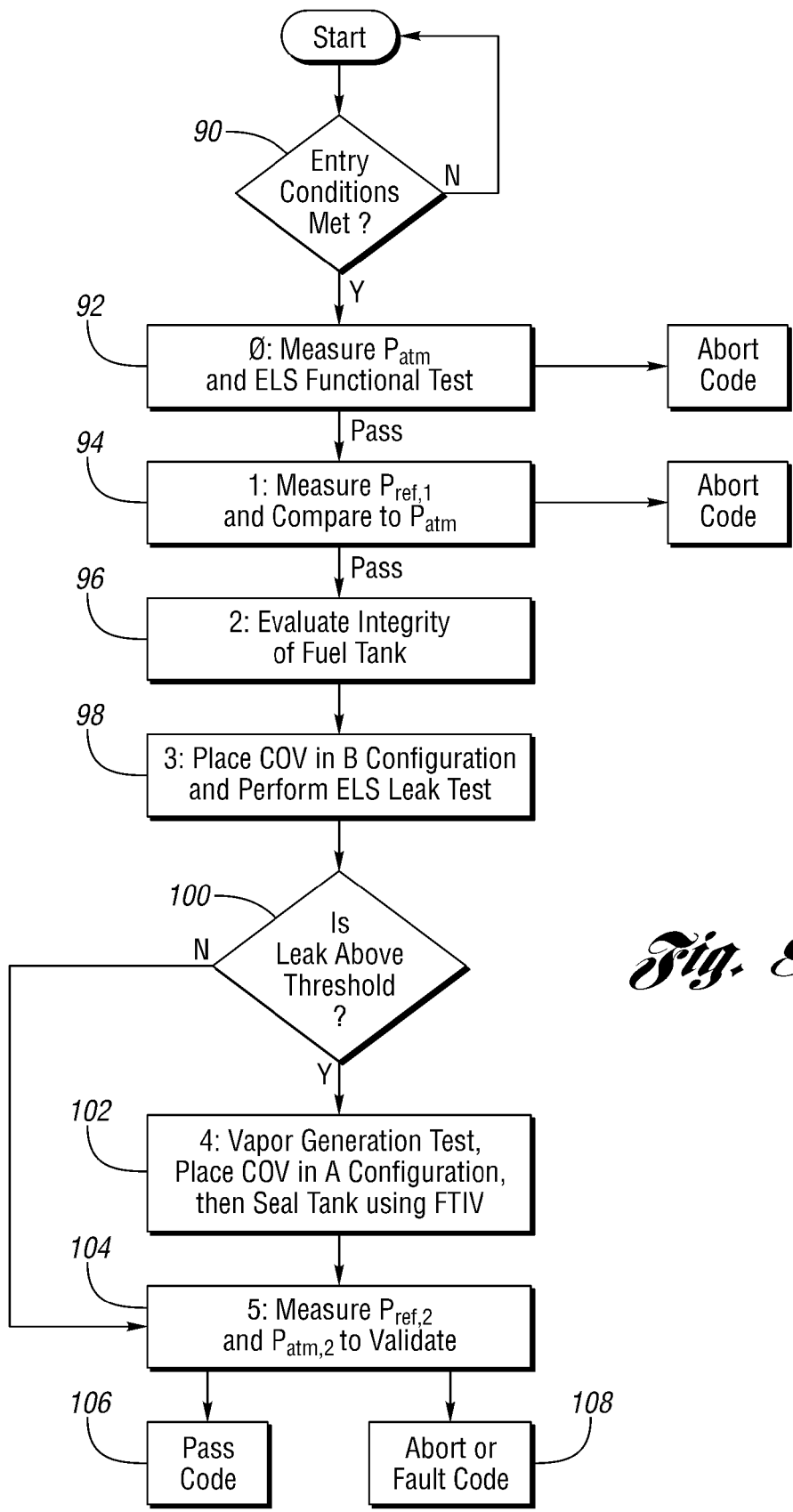
FIG. 8 is a flow chart illustrating a test of the evaporative leak system according to an embodiment.

The ELS 50 diagnostic is composed of several phases, which are described in further detail below. A flow chart of an embodiment of the ELS diagnostic is illustrated in FIG. 8. Any number of phases may be present in an embodiment of the invention, and the numbering of the phases does not necessarily imply a specific order of the phases.

In one embodiment, entry conditions 90 for Phase 0 and the ELS diagnostic include the ECM 67 testing the fuel system 31 and ELS 50 during vehicle operation and while the engine is operating. The CPV 59 is tested for being caught in an open position. The flow path from atmosphere 33 through the filter 60 is tested for restrictions. Finally, the CPV 59 is tested for being caught in a closed position.

Phase 0, shown at 92, the barometric pressure reference and ELS 50 functional tests, is the first phase of the ECM 67 diagnostic and runs if during the drive cycle of the vehicle 10, entry conditions at 90, such as those related to vehicle shutdown, fuel fill level, ambient temperature, etc., for the ECM 67 were satisfied. Entry conditions are evaluated in the strategy once per background loop, e.g. 100 ms. With all the ELS 50 actuators in their unpowered state (as shown in FIG. 2), the system 31 is assumed to be vented to the atmosphere and a barometric pressure measurement is obtained using the pressure sensor 54 and recorded/stored in an associated variable in memory after a programmable warm-up time elapses. In some embodiments, the CPV 59 is opened after the engine is turned off to vent the system 31 to relieve any existing vacuum before the barometric pressure is measured to increase the accuracy of the barometric pressure measurement. The pressure sensor 54 is an absolute sensor whereas a pressure sensor 69, such as a high pressure fuel tank pressure transducer (HPFTPT), is a relative sensor and is located between the FTIV 68 and the fuel tank 32.

To compare the absolute and relative pressures from the respective sensors, the pressure sensor 54 signal is converted to gauge by subtracting the barometric pressure reading and the result is stored in a corresponding parameter as a relative pressure. The pump 52 is turned on and the slope of the pressure sensor 54 measurement is calculated after a programmable or preset time as determined by a corresponding parameter representing time under vacuum plus the warm up time. If the calculated slope is less than a corresponding threshold, then the ECM 67 tentatively infers that the COV 58 is stuck in the energized state (Configuration B) pending the results of the functional test of the pump.

Once the COV 58 functional test is complete, the orifice 56 functional test is performed. The pressure sensor 54 relative pressure is compared to a corresponding threshold to see if too much vacuum was produced, which may be the indication of a clogged orifice 56. If the orifice 56 is clogged, the ECM 67 aborts the leak test and an abort code parameter is set which corresponds to the clogged orifice 56. The last part of the phase is the pump 52 warm-up time delay. Once the warm-up time is met, the pressure sensor 54 relative pressure is compared against a corresponding threshold to determine how much vacuum was generated across the orifice 56 during the warm-up time. Too little vacuum is an indication that the pump 52 is not operating properly in which case the ECM 67 aborts the leak test and an abort code parameter may be used to indicate why the test aborted. Otherwise, the ECM 67 goes on to the next phase.

After successful completion of the Phase 0 functional tests at 92, the ECM 67 progresses to phase 1, the first reference pressure measurement, shown at 94. In phase 1, the pressure sensor 54 relative pressure is averaged over a predetermined or programmable number of counts and the resultant reference check is stored. The first reference check is compared against a table of minimum and maximum reference pressures as a function of the recorded barometric pressure. If the reference check lies outside the corresponding minimum and maximum, the ECM 67 aborts the leak test. The vacuum pump 52 is commanded to be off and the pressure sensor 54 is compared to near atmospheric pressure. If the pressure sensor 54 does not climb back up to above a corresponding threshold, the ECM 67 infers that the vacuum pump 52 is stuck on, the leak test is aborted, and an abort code parameter may be generated. Otherwise, the ECM 67 continues with Phase 2.

After successful completion of Phase 1, ECM 67 progresses to Phase 2, tank pressure evaluation, shown at 96. In phase 2, the filtered tank 32 pressure/vacuum is evaluated using data from the pressure sensor 69 to infer whether the tank 32 is leak-free or not. Generally speaking, if there is ample pressure or ample vacuum buildup in the tank 32 as determined by corresponding thresholds, and the pressure/vacuum variation (high-low readings) in the tank is below a corresponding threshold, as measured by the pressure sensor 69, the inference is that the tank 32 seal integrity is not compromised and that there are no leaks. In such a case, the fuel tank isolation valve (FTIV) 68 is left in its normally closed position and only the canister 30 side of the system 31 is monitored for leaks. If the tank 32 pressure/vacuum is near atmospheric pressure or if the tank 32 pressure/vacuum is high, but with considerable variation, then the FTIV 68 is commanded open and the entire system 31 is monitored for leaks. If an averaged filtered value from the pressure sensor 54 meets the threshold requirement for the test, i.e. 0.02 inch or 0.04 inch, the leak test may be flagged as a pass. The ELS 50 then transitions to Phase 3.

In Phase 3, the fuel system (canister 30 side only or the entire system 31) is evacuated using the vacuum pump 52 for a vacuum pull and leak detection as shown at 98. The COV 58 is in configuration B and the vacuum pump 52 is turned on. The COV 58 functional test is performed to check if the COV 58 is stuck after a predetermined time has elapsed. The rate of change of the pressure measured by the pressure sensor 54 is computed and compared to a corresponding threshold. The ECM 67 aborts the leak test if the computed vacuum slope is too steep. If the COV 58 test passes, the ECM 67 goes on to check the FTIV 68 for a stuck open condition if it had previously been commanded closed. After a check time for the FTIV 68 has elapsed, a pressure sensor 54 slope calculation based on the measured pressure is performed and compared to a corresponding limit. If the slope is too small, the inference is that the FTIV 68 is stuck open, the ECM 67 aborts the leak test, and an abort code parameter may be generated. Conversely, if the FTIV 68 had been commanded open and the computed pressure slope from the pressure sensor 54 is greater than a corresponding threshold, then the inference is that the FTIV 68 is stuck closed, the ECM 67 aborts the leak test, and an abort code parameter may be generated.

Once the functional tests are completed, the ECM 67 goes on to assess the leak integrity of the system 31 as shown at 100. A filtered pressure sensor 54 signal is used and its values are averaged over a predetermined number of counts. Since the reference check threshold obtained in Phase 1 changes with each test, it is desirable to normalize leak results to the reference threshold obtained in that test in order to compare all leak tests together, e.g. FIG. 7. A normalized vacuum is computed and compared to the normalized threshold for a 0.02 inch calibration. For the case where the ECM 67 is calibrated to detect 0.04 inch leaks only, the normalized vacuum result is compared to a normalized threshold for a 0.04 inch calibration. Normalized results greater than the normalized thresholds indicate that no leaks have been detected based on the corresponding leak threshold.

The ECM 67 also computes a slope calculation for a series of predetermined time intervals. The slope is computed from the filtered pressure sensor 54 signal. The slopes are in turn summed and averaged, and this average is compared against a value that is indicative of signal "flat-lining". If the vacuum signal flatlines without crossing the reference check threshold, the inference is that a vacuum leak is present in the fuel system 31 pending a subsequent vapor generation analysis at 102. Should the vacuum signal flatline, the ECM 67 sets a preliminary monitor flag and progresses to phase 4, 102. If the FTIV 68 is open, a flag is set to indicate a potential vacuum leak exceeding the threshold in the entire system 31. If the FTIV 68 is commanded closed, a flag is set to indicate a vacuum leak exceeding the threshold on the canister 30 side of the system.

In phase 4, shown at 102, the system 31 is diagnosed for vapor generation in the case where a leak exceeding the threshold was indicated in phase 3 while the FTIV 68 was opened. Vapor generation results in a positive pressure build up within the system 31 and is typically caused by high relative vapor pressure fuels and/or high ambient temperatures. The positive pressure in the system 31 can overwhelm the vacuum being generated by the low flow pump 52. Depending on the magnitude of the vapor generated, an otherwise satisfactory system 31 may be diagnosed as having a leak because the pump 52 would not be able to draw a sufficient vacuum on the system 31. Hence vapor generation may also be considered to improve the accuracy of the results obtained from Phase 3.

The vapor generation analysis routine is based on the ideal gas law, $PV=nRT$. The temperature and volume (of rigid gas tank 32) are assumed to be constant during the duration of the test. Hence, any pressure change is due to the change in n, the numbers of moles of vapor fuel. The vapor generation analysis routine begins by turning off the vacuum pump 52 and commanding the COV 58 to its vent position (configuration A). With the FTIV 68 open, the system 31 is allowed to vent to atmosphere 33 for an amount of time until the pressure nears atmospheric pressure or it times out. In the case of a timeout, the tank 32 is assumed to have high vapor levels, and even when it is open to atmosphere 33, the tank 32 pressure is unable to equalize with atmospheric pressure. Once the vented tank 32 pressure is close to atmospheric, the FTIV 68 is closed and the tank 32 is sealed for a predetermined amount of time. A positive pressure buildup over a time interval results in aborting the routine and discarding the results of phase 3. The ECM 67 sets an abort code and terminates the leak test.

The vapor generation test is not executed if Phase 3 does not detect a leak that exceeds the threshold. Rather, a stuck closed CPV 59 test is carried out. The test simply opens the CPV 59 to vent the vacuum pulled in the previous phase. If the vacuum does not rise, then the stuck closed CPV 59 flag is set. However, the ECM 67 does not abort the routine because a stuck closed CPV 59 has no influence on leak detection.

A stuck open CPV 59 may also impact the test. A stuck open CPV 59 diagnostic may be performed while the engine is operating and the CPV 59 is commanded to a closed position. The COV 58 is closed (which configuration?) to create a restriction and the pressure is monitored using sensor 54. If the vacuum level in the ELS 50 increases, the CPV is determined to be either open or leaking since the vacuum level is increasing due to the pull from the engine intake, and a flag may be set. A stuck open CPV 59 is the same as a canister 30 side gross leak.

In phase 5, the first reference check is validated as accurate by obtaining a second reference check and comparing the two, as shown at 104. After stabilization time, a barometric pressure reading is obtained and compared to the first barometric pressure reading. If the barometric pressure readings do not coincide within a calibratable limit, the ECM 67 aborts the routine. If the barometric pressure readings are consistent, the ECM 67 continues by turning on the pump 52 for a pre-designated warm-up time. The second reference check is compared against a table of minimum and maximum reference pressures as a function of the recorded barometric pressure as described above with respect to the first reference check. If the second reference check lies outside the minimum and maximum, the ECM 67 aborts the routine. If the second reference check is deemed satisfactory, then the first and second reference checks are compared to one another. If they differ by more than a predetermined amount, then the ECM 67 aborts the routine, and may set an abort code parameter.

Once the reference checks are validated by the ECM 67, the last action the ECM 67 takes is to assign flags that interact with the diagnostic feature of the monitor, as shown at 106, 108. The flag values are based on the test results from phase 3. However, the ECM 67 may not generate a diagnostic code that is persistently stored or otherwise alert the operator or technicians unless the reference checks are validated. This additional precaution should result in more accurate test results and reduce unwarranted repairs or more costly diagnostics.

Should the ECM 67 abort any of the test routines, the abort code and associated cause for the abort may be available for investigation, analysis, and/or maintenance.

For example, in an alternative embodiment, canister 30 integrity is determined in phase 2 by closing the FTIV 68, pulling a vacuum on the canister 30 and measuring pressure. If canister 30 side integrity diagnostic fails against a threshold, the diagnostic stops and a flag is set. If phase 2 passes the canister 30 integrity test, the diagnostic proceeds to phase 3 to evaluate the fuel tank 32. The tank 32 is placed in a vacuum condition and the pressure is measured and compared to a threshold. If the tank 32 is holding its vacuum or pressure level, a pass code is set as the diagnostic code and no further testing is conducted. Otherwise, the diagnostic returns to phase 2, opens the FTIV 68 and pulls vacuum on the entire system 31 to test the entire system 31. If this results in a fault code set as the diagnostic code, a vapor generation test is then conducted.

As such, various embodiments according to the present disclosure permit use of a diagnostic for the fuel system of a vehicle to test for system integrity. The use of a fuel pump in the diagnostic module allows for use of the diagnostic in both conventional and hybrid vehicles, as it does not rely on natural vacuum provided by an engine to supply vacuum to test for fuel system integrity. The diagnostic uses a single orifice to test for system integrity against multiple test thresholds, such as those set by various regulatory agencies, and does not require a different orifice size for each test standard. The diagnostic compares test pressure measurements to various thresholds that represent the various standards. A diagnostic code may be set if the pressure in the fuel system crosses the respective threshold during a test, or if a combination of the slope of the pressure measurement and time indicate a future crossing of the threshold. The diagnostic may initiate within a short time after vehicle shutdown, such as on the order of tens of minutes as opposed to hours in other systems, which provides for a greater frequency of tests over the vehicle lifetime. A vapor generation test may be conducted at the end of the diagnostic to determine the validity of a diagnostic code.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for performing an evaporative leak diagnostic for a vehicle, using a controller performing the steps, comprising:
   commanding a valve in a diagnostic module to a vent position, the valve connecting a fuel system to atmosphere;
   operating a pump in the diagnostic module to measure a reference pressure across an orifice in the diagnostic module to provide a threshold;
   commanding the valve to a test position;
   operating the pump to place the fuel system in a low pressure state;
   measuring a series of pressures in the fuel system; and
   providing a diagnostic code after comparing the series of pressures to the threshold, wherein the diagnostic code is a fault code when at least one of the series of pressure measurements crosses the threshold within a predetermined time, wherein the threshold is a dynamically established threshold.

2. The method of claim 1 wherein the diagnostic code is a fault code when a slope of the series of pressure measurements indicates a future pressure measurement crossing the threshold.

3. The method of claim 2 wherein the slope is determined after a predetermined time.

4. The method of claim 1 further comprising normalizing the series of pressure measurements with the reference pressure before comparison with the threshold.

5. The method of claim 1 wherein measuring the reference pressure across the orifice provides a second threshold.

6. The method of claim 5 further comprising providing a second diagnostic code after comparing the series of pressures to the second threshold.

7. The method of claim 1 further comprising isolating a tank in the fuel system at atmospheric pressure, and monitoring the pressure in the tank using a tank pressure sensor to perform a vapor generation test if the diagnostic code is a fault code.

8. The method of claim 1 wherein the valve in the vent position fluidly connects the fuel system and atmosphere, with the orifice inoperable.

9. The method of claim 1 wherein in the valve and the orifice in the test position fluidly connect the fuel system and atmosphere with the pump operable, wherein the orifice provides an independent flow path from the fuel system to atmosphere compared to the valve in the vent position.

10. The method of claim 1 wherein commanding the valve to the test position isolates the fuel system.

11. The method of claim 1 wherein the steps are performed in sequential order.

12. The method of claim 1 further comprising providing the orifice and the valve are in parallel with one another and interposed between the fuel system and atmosphere.

13. A method of performing an evaporative leak diagnostic for a vehicle comprising:
   providing a diagnostic module having an orifice, a pressure sensor, a changeover valve, a pump, and a controller, the valve and the orifice selectively providing a vapor flow path between a canister of a fuel system and atmosphere in response to a command from the controller;
   comparing, using a controller, a series of pressure measurements from the system in a low pressure state to a variable reference pressure measured across the orifice; and
   providing a code using the controller when at least one of the series of pressure measurements crosses a dynamically established threshold within a predetermined time.

* * * * *